US005791759A

United States Patent [19]

Dassanayake et al.

[11] Patent Number: 5,791,759

[45] Date of Patent: Aug. 11, 1998

[54] REDUCED PACKAGE DEPTH LOW PROFILE LAMP WITH CONIC SECTION CYLINDERS

[75] Inventors: Mahendra S. Dassanayake, Farmington Hills; Alfred Wasilewski, Northville, both of Mich.

[73] Assignee: Ford Global Technologies, Inc., Dearborn, Mich.

[21] Appl. No.: 607,546

[22] Filed: Mar. 1, 1996

[51] Int. Cl.[6] .................... B60Q 1/00

[52] U.S. Cl. .................... 362/61; 362/80; 362/308; 362/309; 362/336; 362/338

[58] Field of Search .................... 362/61, 80, 308, 362/309, 335, 336, 338

[56] References Cited

U.S. PATENT DOCUMENTS

| | | | |
|---|---|---|---|
| 1,579,855 | 4/1926 | Beyer . | |
| 1,601,688 | 9/1926 | Nystrom . | |
| 1,788,926 | 1/1931 | Wood . | |
| 2,082,100 | 6/1937 | Dorey et al. . | |
| 4,577,260 | 3/1986 | Tysoe . | |
| 4,684,919 | 8/1987 | Hihi . | |
| 4,733,335 | 3/1988 | Serizawa et al. . | |
| 5,515,253 | 5/1996 | Sjobom | 362/800 |

FOREIGN PATENT DOCUMENTS

| | | | |
|---|---|---|---|
| 479109 | 7/1929 | Germany | 362/338 |
| 24 08 594 | 2/1975 | Germany . | |

*Primary Examiner*—Thomas M. Sember
*Attorney, Agent, or Firm*—Daniel M. Stock

[57] ABSTRACT

A reduced package depth low profile lighting system has a light source emitting light at a solid lens for shaping the light to conform to governmental lighting standards. The solid lens has a first surface comprised of a plurality of conic section cylinders. Each of the cylinders has a length first focal line, a second focal line and a cylinder line. The first focal line is tangent to a package curve preferably defined by a circle preferably in the horizontal plane of the vehicle. The circle has a center and a predetermined radius length. The center is coincidence with the light source. Each of conic cylinders substantially collimates light in the vertical plane while spreading light in the horizontal plane within a predetermined angle from the optical axis.

20 Claims, 3 Drawing Sheets

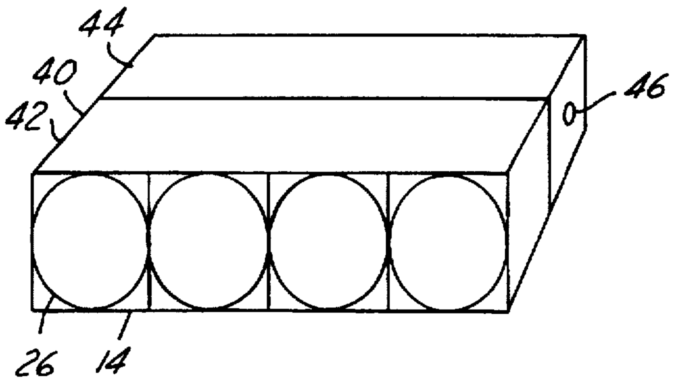
FIG.5
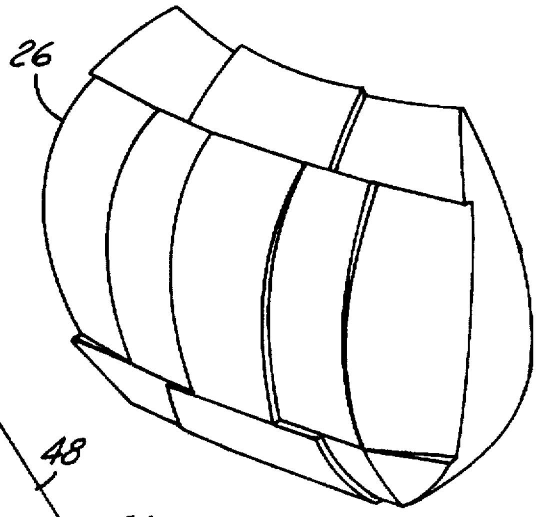
FIG.6
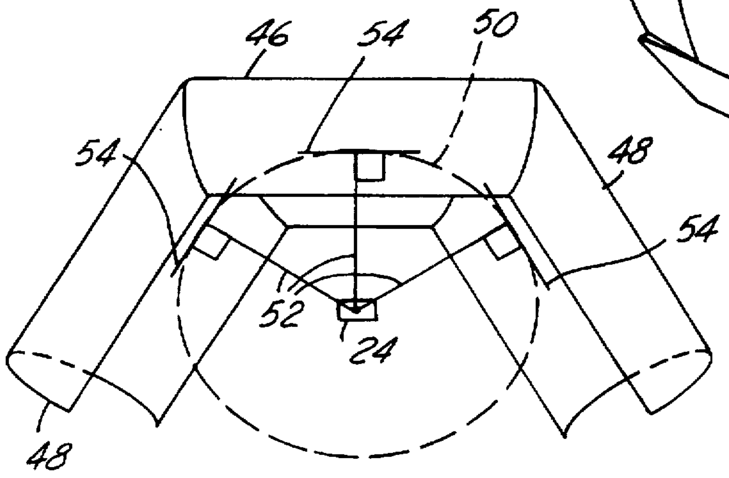
FIG.7
FIG.8
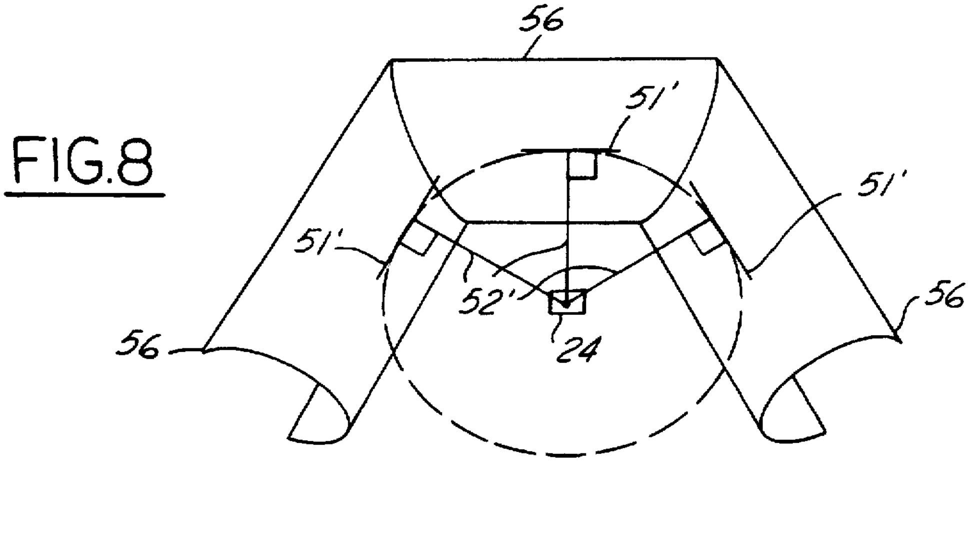

REDUCED PACKAGE DEPTH LOW PROFILE LAMP WITH CONIC SECTION CYLINDERS

RELATED APPLICATIONS

The present invention is related to commonly assigned concurrently filed applications Ser. No. 08/607,545 and 08/607,947 filed Mar. 1, 1996.

BACKGROUND OF THE INVENTION

The present invention relates to a forward lighting system for an automotive vehicle and, more specifically to an improved lighting system having a relatively small package height and depth.

Light distribution systems employing fiber optic cables for vehicle forward lighting are generally known in the art. The light distribution patterns of such forward lighting systems must ensure that adequate lighting is provided for the vehicle operator while minimizing visual interference with other drivers. Standards are set for cutoffs in front of the automobile above which light from a forward lighting system should not travel to avoid dazzling other drivers.

One such system uses round fiber optic bundles connected to a motor to move the fiber optic bundles in relation to a fixed lens to create the high beam and low beam patterns of the forward image. Such a design occupies considerable space at the front of the vehicle. Yet another disadvantage of that system is that it employs moving parts that may cause reliability problems in commercial high production applications.

Commonly assigned U.S. patent (application Ser. No. 08/342,065 filed Nov. 18, 1994 now U.S. Pat. No. 5,558,716) describes a system in which a lens having a spherical inner surface and elliptical outer surface is regulation conforming beam pattern. A smaller package size and more stylish appearance are achieved when the diffusing lens is eliminated. Governmental lighting requirements cannot be met using if the diffusing lens is removed.

It would therefore be advantageous to provide a lighting system that has a relatively small package depth and package height while providing acceptable beam patterns without moving parts.

SUMMARY OF THE INVENTION

One object of the invention is to advantageously provide a reduced package size forward lighting system with a good beam pattern in package having reduced depth.

The present invention includes a light source emitting light and a solid lens for shaping the light to conform to governmental lighting standards. The solid lens has a first surface comprised of a plurality of conic section cylinders. Each of the cylinders has a length, a first focal line, a second focal line and a cylinder line. The first focal line is tangent or parallel to a tangent of a package curve defined by a circle having a first center and a predetermined radius length. The center is coincidence with the light source. Each of the conic cylinders substantially collimates light in the vertical plane while spreading light in the horizontal plane within a predetermined angle from the optical axis.

BRIEF DESCRIPTION OF THE DRAWINGS

These and other objects, advantages, and features of the present invention will be apparent to those skilled in the art upon reading the following description with reference to the accompanying drawings, in which:

FIG. 4 is a diagrammatic view of the relationship of the light source and a hyperbolic cylinder lens.

FIG. 5 is a perspective view of the converging lens in relation to the housing.

FIG. 6 is a perspective view of a lens having elliptical cylinders.

FIG. 8 is a diagrammatic view of a row of hyperbolic cylinders on a lens according to the present invention.

DETAILED DESCRIPTION OF THE PREFERRED EMBODIMENT

Figure 1:
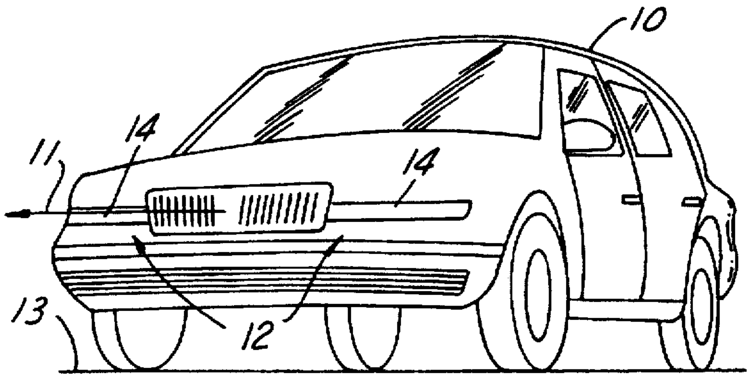
FIG. 1 is a perspective of an automobile having a forward lighting system according to the present invention.

Referring now to FIG. 1, the front of an automotive vehicle 10 with a longitudinal axis 11 has a forward lighting system 12 used for both the high beam applications and low beam applications. Automotive vehicle 10 is placed upon a horizontal plane 13 representative of a road surface. Lighting system 12 has two lighting units 14 that may include but are not limited to a combination of forward lights including low beams, high beams, fog lamps, turn signal indicators and cornering lamps. Also, the system is equally suitable for rear automotive applications such as brake lamps, turns signal lamps and the like. Since regulatory requirements are most stringent for low beams, the description is primarily directed to low beams.

Figure 2:
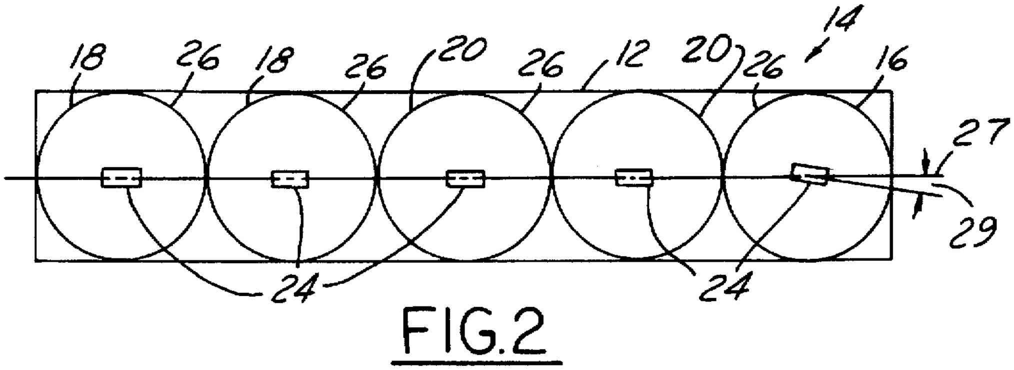
FIG. 2 is a front view of a light distributor according to the present invention.

Referring now to FIG. 2, forward lighting system 12 is described with reference to one lighting unit 14. Lighting unit 14 may be comprised of several individual identical segments that together provide the desired light output. In a preferred embodiment, lighting unit 14 includes a high intensity zone illuminator 16, two low beam segments 18 and two high beam segments 20. In providing a low beam light output of 500 lumens, the two low beam segments 18 each generate 200 lumens and high intensity zone illuminator generates 100 lumens. Lighting unit 14 may also include intermediate segments for a variable beam system.

As shown, the segments are placed side by side. However, several configurations may be used depending on the design requirements of the individual application. The size of lighting unit 14 is about 40 mm high. The length varies depending on the number of segments. The depth of the system is about 70 mm, which compares to 160 mm for prior art devices. The 40 mm height is very low compared to prior art forward lighting and allows automobile designers more flexibility in the front end design of an automotive vehicle.

An individual lighting unit 14 is comprised of a light emitter 24 in a fixed relation to a converging lens 26. Light emitter 24 is preferably planar and rectangular in shape to improve the desired cutoffs. Light emitter 24 for high intensity zone illumination in the preferred embodiment is 5 mm long and 2 mm wide. Facilitating compliance with cutoffs is the angle 29 between the axis of light emitter 24 and a horizontal axis 27. Angle 29 was found to give the most distinct cutoffs at about 12° from horizontal axis 27.

The size of light emitter 24 for the low beams and high beams is preferably 5 mm long and 4 mm wide. An output of 10–13 lumens per square millimeter may be achieved. Light emitter 24 is shown as a light pipe. Light emitter 24, however, can also be a number of different types of light sources including a bundle of fiber optic cables, an arc discharge lamp or incandescent filament. Low beam segments 18 and high beam segments 20 do not require inclination from the horizontal axis since light cutoffs are controlled by lens optics differently than the high intensity zone.

Figure 3:
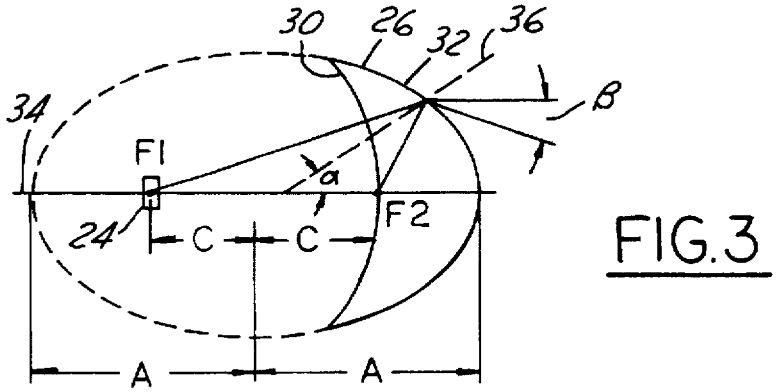
FIG. 3 is a diagrammatic view of the relationship of the light source and an elliptic cylinder lens.

Lens optics for low beam segments use conic section cylinders to form the proper beam pattern. Described below are low beam lamps using elliptic cylinders and hyperbolic cylinders. Referring now to FIG. 3, a vertical section along the optical axis 34 of the individual lighting unit is shown. Converging lens 26 has an inner surface 30 and an outer surface 32. Outer surface 32 is formed of several rows of elliptical cylinders in shape and has a first focal line F1 and a second focal line F2 located on an optical axis 34 (the focal lines extend out of the page). Inner surface 30 is spherical with a radius centered at F1 and a length equal to the distance between F1 and F2. From the above geometry, it follows that the inner surface 30 intersects F2. Light emitter 24 is located at point F1.

Low beam segment 18 has the above mentioned shape to increase light transference. When light emitter 24 is located at the center of inner surface 30, all the light incident on converging lens 26 is transferred into converging lens 26 since the light incident on the surface is perpendicular to a tangent (not shown) on inner surface 30. The greater the angle of light incident on the face is from a normal to the surface, the lesser the amount of light transferred into the surface. Therefore, the preferred shape of inner surface 30 is a sphere having a light source at its center.

The distance between the two focal lines is (2C), i.e., the distance between a focal line and axis of symmetry 31, is (C). Half the length of the major axis of the ellipse is the length (A), i.e., the distance between the curve and axis of symmetry 31. The optical axis 34 of the lens is preferably parallel to longitudinal axis 11 of automobile. Converging lens 26 is preferably made of glass or plastic having an index of refraction (n) of about 1.5. The light output deviation angle (β) from optical axis 34 is related to the shape of the lens by the formula:

$$\beta = \sin^{-1}\left[\frac{Cn}{A}\sin\alpha\right] - \alpha$$

where the angle α is the angle between a local normal 36 to the outer surface 32 of converging lens 26 and optical axis 34. It follows from the formula that if the ratio A/C is equal to the refractive index that the light will be collimated parallel to longitudinal axis 34. This alone may be undesirable in a forward lighting system since a slight downward angle is needed to illuminate the road surface in front of the automobile. Because of this geometry, smaller and brighter images are located closer to longitudinal axis 34 whereas larger dimmer images are located further from longitudinal axis 34. This is also critical in the design of forward lighting systems because a predetermined beam pattern is desired and having a brighter images located close to longitudinal axis 34 facilitates beam control.

Referring now to FIG. 4, a vertical section along the optical axis 34' of a low beam segment 18 using a hyperbolic cylinder is shown. Common elements from FIG. 3 are shown using the same numbers but are primed. In this configuration, low beam segment 18 has an inner surface 30' and an outer surface 32'. Inner surface 30' is comprised of a plurality of hyperbolic cylinders. Outer surface 32' is comprised of a planar surface that is preferably perpendicular to optical axis 34' and to the horizontal plane not shown. Consequently, outer surface 32' has a limited effect on the light direction. Light emitter 34' is located at point F1'. Inner surface 30' provides most of the required beam shaping.

For a hyperbola, the difference of the distances from the foci to any point on the hyperbola is constant. The hyperbola generally has two portions, one around each of the foci. Only one of the curves is used for the lens.

The distance between the two focal lines extending out of the page is (2C'), i.e., the distance between a focal point and axis of symmetry 31' is (C'). Half the length of the major axis of the hyperbola is the length (A'), i.e., the distance between the curve and axis of symmetry 31'. The light output deviation angle (β') from longitudinal axis 34' is related to the shape of the lens by the formula:

$$\beta' = \sin^{-1}\left[n\sin\left[\sin^{-1}\left[\frac{C}{nA}\sin\alpha'\right] - \alpha'\right]\right]$$

Where the angle (α') is the angle between a local normal 36' to the inner surface 30' and optical axis 34'. It follows from the formula that if the inverse of the ratio A/C is equal to the refracted index that the light would be collimated parallel to longitudinal axis 34. As in the elliptical case, this may be undesirable in a forward lighting system since its light downward angle is needed. Opposite the elliptical case, smaller and brighter images are located further from the longitudinal axis 34' whereas larger dimmer images are located close to the longitudinal axis 34'. To compensate for the difference, the light source instead of having a Gaussian distribution, as in the elliptical case, may have a double Gaussian distribution, i.e., where the center of the filament does not emit as much light points between the center and end of the filament. A double Gaussian filament essentially has two hot spots.

Referring now to FIG. 5, a housing 40 containing an individual lighting unit 14 is shown having two portions, a front housing 42 and a back housing 44. Front housing 42 secures converging lens 26 in a fixed relationship to the light distributor secured by housing 44 through locating hole 46.

Referring now to FIG. 6, a lens 26 using elliptical cylinders is shown. A horizontal section through the center of the lens has a total of five elliptic cylinders. A horizontal section through the upper portion and lower portion of the lens has three elliptic cylinders (see FIG. 7). Preferably each of the elliptic cylinders has the same A/C ratio. Likewise, when hyperbolic cylinders are used, the C/A ratio is also preferably the same.

The height of the cylinders is essentially determined arbitrarily for styling to provide a desirable segmented appearance.

Figure 7:
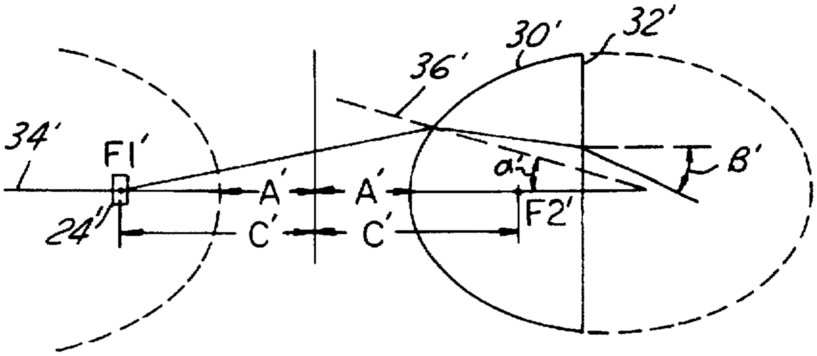
FIG. 7 is a diagrammatic view of a row of elliptical cylinders on a lens according to the present invention.

Referring now to FIG. 7, a row of elliptical cylinders is shown (exaggerated to illustrate the curve). Rows, for example, can be the upper or lower rows of the figure in FIG. 6. A package curve 50 is preferably defined by a circle having a radius 52 centered at light emitter 24. The plane of the circle is substantially parallel to the plane of the road. Focal lines of elliptic cylinders 48 are coincident or parallel to a tangent 54 to package curve 50 at one point. If the package curve has a radius of (2C) the focal lines are coincident with tangent 54. If the package curve is defined as the outermost point of the lens, i.e., a parallel to tangent 54 is used and radius is of the curve is (A+C). A geometric shape other than a circle may be used for the package curve, however, a circle is preferred.

The length of elliptic cylinders 48 are determined by the desired spreading of each cylinder. The light tangent to the package curve from emitter 24 has essentially no spreading. As the distance from the tangent point to the package curve 50 increases the horizontal spreading increases. Spreading does not occur in the vertical direction. A desired amount of spreading is about 25° from the radius. Tangent 54 is the focal line or parallel to the focal line of the elliptic cylinder 48. Preferably, elliptic cylinders 48 smoothly join the adjacent elliptic cylinder in the same row. In the top row, three elliptic cylinders are provided in a row and achieve the desired spreading. In the center row, it is preferable that five elliptic cylinders are used. This is due to the phenomenon that smaller, brighter images are located closer to the optical axis of the lens. In the upper rows the distance from the optical axis is increased and thus smaller images are projected from these rows requiring less beam spreading. Also because of the smaller images being further from the optical axis, the number of facets does not need to be as great as the rows toward the middle.

Referring now to FIG. 8, the outer surface of a lens using hyperbolic cylinders is shown. The figure is described using prime numbers for the common features from FIG. 7. The hyperbolic cylinders have a package curve 50' defined by a radius 52'. Tangent 54' may be coincident to focal line of the hyperbolic cylinder 56 if the radius of the package curve is (2C) as is shown. It is preferred that the C/A ratio of the hyperbolic cylinders is also the same for each cylinder.

Figure 9:
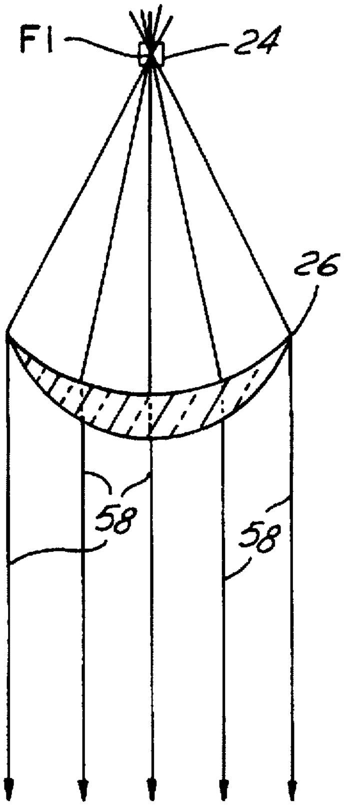
FIG. 9 is a cross sectional view of the lens of FIG. 6 in the vertical plane distributing collimated light.

Referring now to FIG. 9, a reproduction of a computer model of a vertical cross section of a lens 26 is shown with light rays 58 its light output from light source 24. As is described above, a lens 26 in a vertical direction collimates light.

Figure 10:
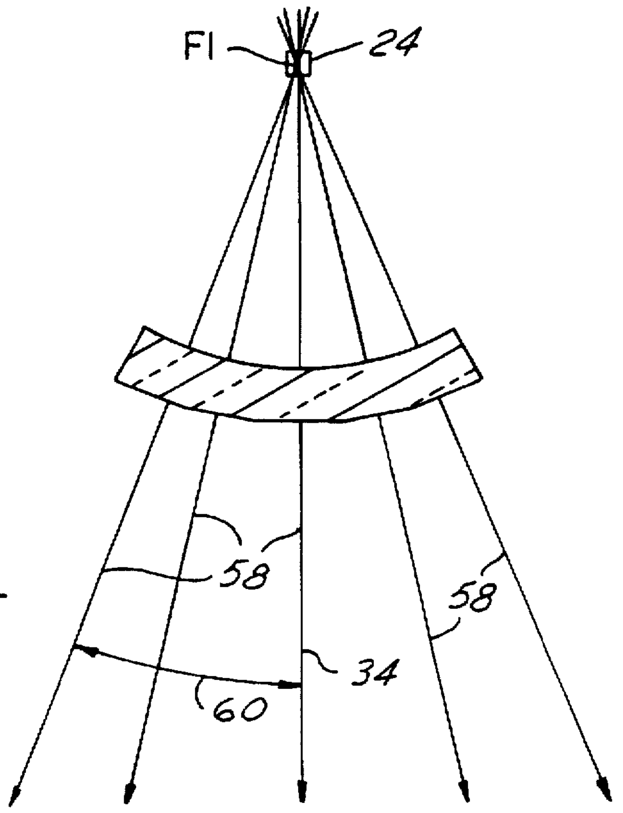
FIG. 10 is a cross sectional view of the lens of FIG. 6 in the horizontal plane distributing light having a predetermined spread.

Referring to FIG. 10, a reproduction of a computer model of a horizontal cross section of a lens 26 is shown. Lens 26 preferably spread light rays 58 with respect to optical axis 34. The angle 60 of the light from the optical axis 34 is preferably about 25°. The light output of FIG. 10 is shown using an elliptic cylinder. Equal light output can be obtained by using hyperbolic cylinders using similar methodology as described above.

Figure 11:
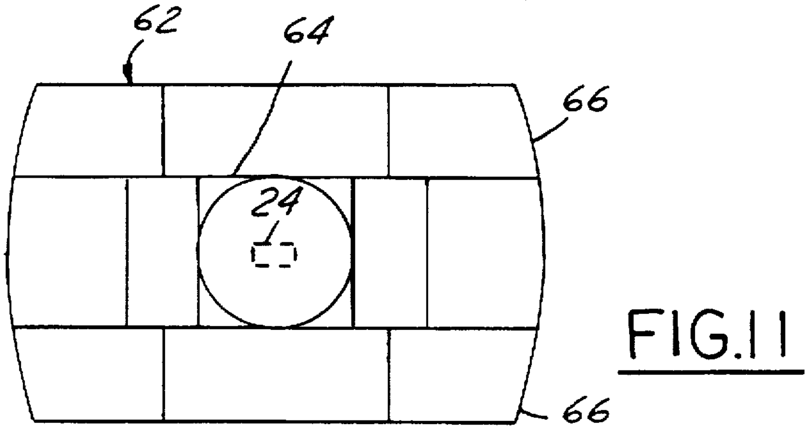
FIG. 11 is an alternative arrangement of the light source having both a high intensity region and conic section cylinder portions.

Referring now to FIG. 11, a lens 62 is shown having a combination high intensity region 64 and spreading region 66. Light emitter 68 is shown behind lens 62. High intensity region 64 preferably comprises a continues conic section, i.e., one having a constant A/C ratio to concentrate light, e.g., at a hot spot of a beam pattern. Spreading region 66 has conic section cylinders as described above and in this use primarily used for their light spreading capabilities. The conic section cylinders are preferably the same conic section as the high intensity region.

Various modifications will be apparent to those skilled in the art. For example, different arrangement of lighting segments may be employed. Also the package curve may be shapes other than a circle. All such modifications would be within the scope of this invention.

What is claimed is:

1. A lighting system for an automotive vehicle having an optical axis, a longitudinal axis, a horizontal plane, and a vertical plane perpendicular to said horizontal plane and parallel to the longitudinal axis of said vehicle, said lighting system comprising:

a light source emitting light; and a solid lens defining a package curve and having a first surface comprised of portions of a plurality of conic section cylinders, each conic section cylinder having a first focal line and a second focal line and a cylinder length, each of said first focal lines parallel to a line tangent to the package curve, each of said conic section cylinders substantially collimating light in the vertical plane and spreading light in the horizontal plane within a predetermined angle from the optical axis.

2. A lighting system as recited in claim 1 wherein said package curve is a circle having a first center and a predetermined radius length, said center-coincident with said light source.

3. A lighting system as recited in claim 2 wherein said circle is in a plane parallel to said horizontal plane.

4. A lighting system as recited in claim 1 wherein said conic section cylinders have an axis of symmetry and distance from said axis of symmetry to said cylinder is (A) and distance from said axis of symmetry to the focal line is (C), wherein said conic section cylinders have a predetermined substantially equivalent ratio of A to C.

5. A lighting system as recited in claim 1 wherein said conic section is a hyperbola, said first surface is said inner surface.

6. A lighting system as recited in claim 5 further comprising a second surface, said second surface comprising a planar surface.

7. A lighting system as recited in claim 1 wherein said conic section is an ellipse, wherein said first surface is an outer surface, said first surface comprising an elliptical cylinder.

8. A lighting system as recited in claim 7 further comprising a second surface, said second surface is an inner surface comprising a spheroid.

9. A lighting system as recited in claim 8 wherein said lens having a plurality of rows.

10. A lighting system as recited in claim 1 wherein said light source generates a cone of light having half angles of about 30 degrees, said lens is sized to receive substantially all of said light emitted by said light source.

11. A lighting system for an automotive vehicle having an optical axis, a longitudinal axis, a horizontal plane, and a vertical plane perpendicular to said horizontal plane and parallel to the longitudinal axis of said vehicle, said lighting system comprising:

a light source emitting light;

a solid lens defining a package curve and having a first surface having a high intensity region and a spreading region and a second surface;

said high intensity region comprising a continuous conic section surface having a first focal point; and said spreading region comprising a first surface having a plurality of conic section cylinders, each conic section cylinder having a first focal line and a second focal line and a cylinder length, said first focal line of each of said cylinders parallel to a line tangent to the package curve, each of said conic section cylinders substantially collimating light in the vertical plane and spreading light in the horizontal plane within a predetermined angle from the optical axis.

12. A lighting system as recited in claim 11 wherein said package curve is defined by a circle having a first center and a predetermined radius length, said center coincident with said light source and said first focal point of said conic section cylinder.

13. A lighting system as recited in claim 12 wherein said circle is in a plane parallel to said horizontal plane.

14. A lighting system as recited in claim 11 wherein said first surface is said inner surface, said conic section cylinders comprising hyperbolic cylinders.

15. A lighting system as recited in claim 14 further comprising a second surface, said second surface comprising a planar surface.

16. A lighting system as recited in claim 11 wherein said first surface is an outer surface, said conic section cylinders comprising elliptic cylinders.

17. A lighting system as recited in claim 16 said second surface is an inner surface comprising a spheroid having a second center coincident with said first center.

18. A lighting system as recited in claim 16 wherein said first surface is said inner surface, said first and second conic section-shaped surface comprising a hyperbolic shape and said second lenses further comprising a second surface, said second surface of said plurality of second lenses and said second surface of said first lens comprising a planar surface.

19. A lighting system as recited in claim 16 wherein said first surface is an outer surface, said first and second conic section-shaped surfaces comprising and elliptic shape and said second lenses further comprising a second surface, said second surface of said first lens and second surface of said plurality of said second lenses is an inner surface comprising a second spheroid each having a center coincident with said first light source.

20. A forward lighting system for an automotive vehicle having a longitudinal parallel to a horizontal road plane, said lighting system comprising:

a housing;

a plurality of light sources fixed within said housing for emitting light in a direction substantially parallel to the longitudinal axis of said automotive vehicle;

a first lens defining a package curve and having a first surface and a second surface, said first surface having first conic section-shaped surface; and a plurality of second lenses, each light source having a corresponding lens fixed with the housing, each of said lenses having a first surface comprised of a plurality of cylinders having second conic section-shaped surface, each second conic-shaped section having a first focal line and a second focal line and a cylinder length, said first focal line tangent to the package curve defined by a circle having a first center and a predetermined radius length, said center coincident with said light source, each of said conic section cylinders substantially collimating light in the vertical plane and spreading light in the horizontal plane within a predetermined angle from the optical axis.

* * * * *